US011838861B2

(12) United States Patent
Turtinen et al.

(10) Patent No.: US 11,838,861 B2
(45) Date of Patent: Dec. 5, 2023

(54) HANDLING UE CONTEXT UPON INACTIVITY

(71) Applicant: Nokia Technologies Oy, Espoo (FI)

(72) Inventors: Samuli Turtinen, Ii (FI); Juho Pirskanen, Kangasala (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/349,041

(22) PCT Filed: Nov. 10, 2017

(86) PCT No.: PCT/IB2017/057054
§ 371 (c)(1),
(2) Date: May 10, 2019

(87) PCT Pub. No.: WO2018/092010
PCT Pub. Date: May 24, 2018

(65) Prior Publication Data
US 2020/0196234 A1 Jun. 18, 2020

Related U.S. Application Data

(60) Provisional application No. 62/422,411, filed on Nov. 15, 2016.

(51) Int. Cl.
*H04W 52/02* (2009.01)
*H04W 76/19* (2018.01)
(Continued)

(52) U.S. Cl.
CPC ....... *H04W 52/0216* (2013.01); *H04W 24/08* (2013.01); *H04W 52/0274* (2013.01);
(Continued)

(58) Field of Classification Search
CPC . H04W 52/0216; H04W 76/19; H04W 76/27; H04W 24/08; H04W 52/0274;
(Continued)

(56) References Cited

U.S. PATENT DOCUMENTS 8,699,509 B2 * 4/2014 Chin .................... H04W 68/00
455/515
2005/0250529 A1 11/2005 Funnell et al.
(Continued)

FOREIGN PATENT DOCUMENTS

| EP | 2832144 A1 | 2/2015 |
| WO | 2015/171984 A1 | 11/2015 |
| WO | 2016/123809 A1 | 8/2016 |

OTHER PUBLICATIONS

3GPP TS 36.304 V14.0.0 (Sep. 2016) (Year: 2016).*
(Continued)

*Primary Examiner* — Mandish K Randhawa
(74) *Attorney, Agent, or Firm* — Harrington & Smith

(57) ABSTRACT

A method is provided including configuring by a first network node (20-S) a timer for a UE (10) which is started when an inactivity criteria is met, upon expiry of the timer, allowing cell reselection for the UE (10) based on a frequency criteria between a first frequency and at least a second frequency; and forwarding the UE context by the first network node (20-S) controlling the first frequency to at least a second network node (20-T) controlling the at least second frequency.

19 Claims, 5 Drawing Sheets

(51) Int. Cl.
  *H04W 76/27* (2018.01)
  *H04W 24/08* (2009.01)
  *H04W 68/00* (2009.01)
(52) U.S. Cl.
  CPC ......... *H04W 68/005* (2013.01); *H04W 76/19* (2018.02); *H04W 76/27* (2018.02)
(58) Field of Classification Search
  CPC ........... H04W 68/005; H04W 52/0206; H04W 36/0033; Y02D 30/70
  See application file for complete search history.

(56) References Cited

U.S. PATENT DOCUMENTS

| | | | |
|---|---|---|---|
| 2012/0329462 A1 | 12/2012 | Pica et al. | |
| 2013/0258883 A1 | 10/2013 | Vargas Bautista et al. | |
| 2014/0038607 A1* | 2/2014 | Makharia | H04W 72/542 |
| | | | 455/436 |
| 2016/0127969 A1 | 5/2016 | Pao et al. | |
| 2020/0022214 A1* | 1/2020 | Takahashi | H04W 76/11 |

OTHER PUBLICATIONS

"New SID Proposal: Study on New Radio Access Technology", 3GPP TSG-RAN meeting #71, RP-160671, Agenda: 9.1, NTT Docomo, Mar. 7-10, 2016, 8 pages.

International Search Report and Written Opinion received for corresponding Patent Cooperation Treaty Application No. PCT/IB2017/057054, dated Feb. 22, 2018, 16 pages.

"UE State Transition Diagram for NR", 3GPP TSG-RAN WG2 meeting #96, R2-168077, Agenda: 9.2.2.1, NTT Docomo Inc., Nov. 14-18, 2016, pp. 1-7.

"3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304, V14.5.0, Dec. 2017, pp. 1-49.

"NR Cell for Idle State", 3GPP TSG-RAN WG2 meeting #95bis, R2-166125, Agenda: 9.3.1.3, CATT, Oct. 10-14, 2016, pp. 1-6.

Extended European Search Report received for corresponding European Patent Application No. 17870857.4, dated Apr. 9, 2020, 18 pages.

Office action received for corresponding European Patent Application No. 17870857.4, dated Jun. 8, 2021, 11 pages.

* cited by examiner

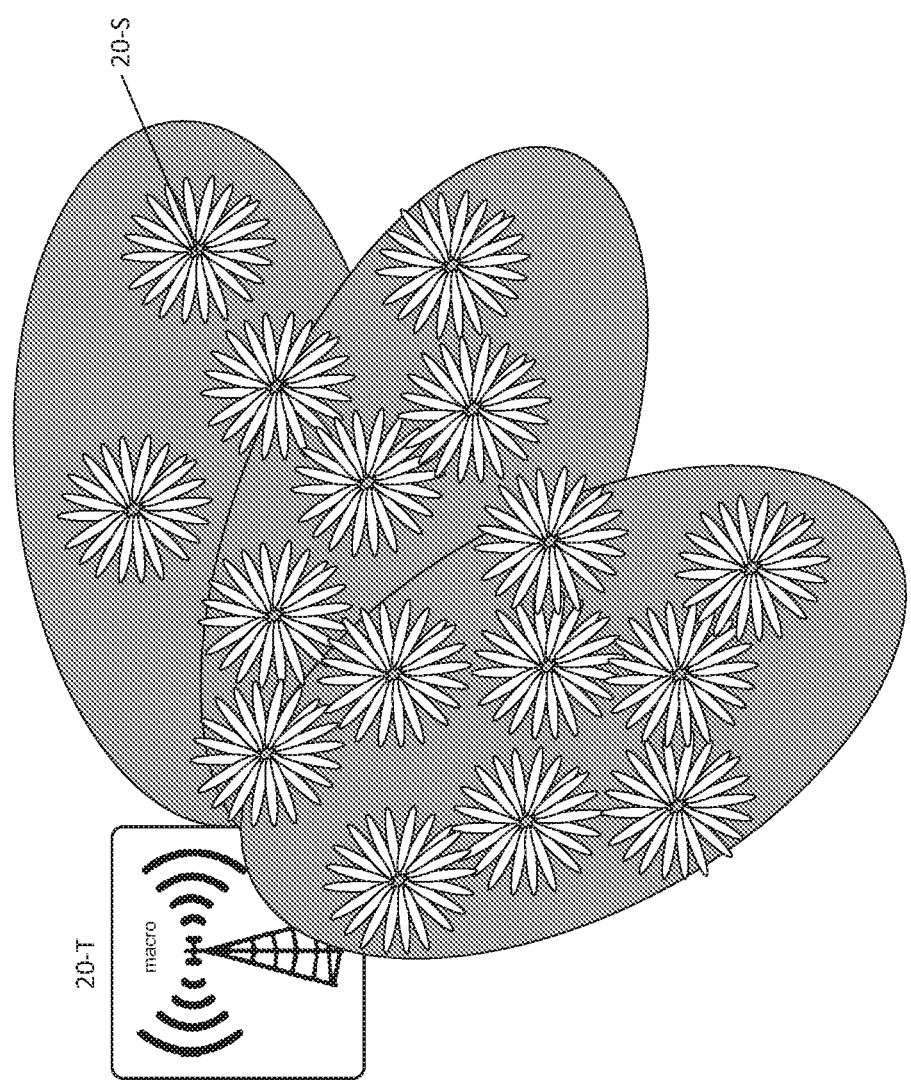

402: configuring by a first network node a timer for a UE which is started when an inactivity criteria is met 404: upon expiry of the timer, allowing cell reselection for the UE based on a frequency criteria between a first frequency and at least a second frequency 406: forwarding the UE context by the first network node controlling the first frequency to at least a second network node controlling the at least second frequency

FIG. 4A

452: receiving at a UE from a first network node on a first frequency layer a configuration comprising a timer and information about a second frequency layer 454: initiating the timer upon the UE entering an inactive state 456:
- prior to expiry of the initiated timer, monitoring paging occasions on the first frequency layer; and
- upon expiry of the timer, autonomously monitoring paging occasions on the second frequency layer

FIG. 4B

HANDLING UE CONTEXT UPON INACTIVITY

RELATED APPLICATION

This application was originally filed as Patent Cooperation Treaty Application No. PCT/IB2017/057054 filed Nov. 10, 2017 which claims priority benefit to U.S. Provisional Patent Application No. 62/422,411, filed Nov. 15, 2016.

TECHNOLOGICAL FIELD

The described invention relates to wireless communications, and more particularly to keeping user equipment (UE) context within certain nodes of a radio network that employs beamforming.

BACKGROUND

Wireless radio access technologies continue to be improved to handle increased data volumes and larger numbers of subscribers. The 3GPP organization is developing 5th Generation (5G) wireless networks [also known as New Radio (NR)] to handle peak data rates of the order of ~10 Gbps (gigabits per second) while still satisfying ultra-low latency requirements in existence for certain 4G applications. 5G intends to utilize radio spectrum on the order of GHz or more in the millimeter-wave (mmWave) band; and also to support massive MIMO (m-MIMO). M-MIMO systems are characterized by a much larger number of antennas as compared to 4G systems, as well as finer beamforming and a higher antenna gain.

To compensate the increased path loss when operating on higher frequencies, beamforming is seen essential for providing adequate cell coverage. In this regard different transceiver architectures are being considered for 5G radio access system: digital, analogue or so-called hybrid which utilizes digital baseband precoding and analog beamforming. Such hybrid or even fully analogue architectures are intended for 5G deployment where the number of antenna elements required for cell coverage may range from tens to hundreds. Systems deployed to lower frequencies (generally below 6 GHz) are typically implemented by using fully digital architecture, and fully digital architectures can certainly also be implemented for 5G signal processing. The higher frequencies where the number of antenna elements required for cell coverage may range from tens to hundreds may be implemented by using hybrid-analog-digital architecture, or even fully analogue architecture.

In a beam formed radio network where the cell coverage is provided by multiple beams, it may be beneficial to identify a single beam. One way to do this which is strongly considered for 5G systems is to use beam specific reference signals (BRSs) which enable the UE to perform beam level detection/separation and to perform measurements such as reference signal received power or quality (RSRP or RSRQ, or more generally received signal strength indication RSSI), channel quality indication (CQI) and the like on specific beams. Identifying different beams may be beneficial for example when the UE indicates to the network its preferred communication beam during the UE's initial network access, or when mapping a measurement to a common reference index when the UE reports its beam measurements to the network (for example, in a beam status report BSR).

Consider UE mobility in a beamformed radio system such as 5G. it will be expensive in terms of radio resources to page a UE in the higher frequency layer (thus utilizing many antenna panels and beams) that has moved into a radio resource control inactive state (such as the RRC idle state or RRC Inactive state). This is because the cell sizes may be smaller than a traditional LTE/4G-type macro cell, and additionally the beamforming aspects of the system may significantly increase the paging load. If the UE's best beam is not known by the network seeking to page it, the network would need to send some kind of downlink data indication (such as a paging indicator) into every single beam in a cell, and most likely in multiple cells since the cells are relatively small.

Additionally, in the 5G radio system the higher frequencies support very wideband and short symbol lengths to enable both radio-frequency (RF) and baseband processing to keep up with the very high data rates that are to be required. When there is active data transmission to the UE this wideband/short symbol feature of 5G is justified over the increased draw this fast wideband processing imposes on the UE's power consumption. But during periods of data inactivity this increased power draw on the UE is not acceptable for a practical system. It is for this reason that the UE needs to be moved very rapidly to the inactive state whenever appropriate in view of data transmissions; to reduce UE power consumption which is generally higher than in other radio access technologies that are currently in wide deployment around the world.

There is a problem with the UE's inactive state being controlled by the radio access network (RAN) as is being considered for the 5G system; in that case the UE's last-serving RAN node will be handling the UE context until the UE comes active again via some other RAN node (if the inactive UE now has data to send) or the UE needs to be paged (if the network has data for the inactive UE). In the latter case, the last-serving RAN node in such a 5G system would initiate the paging procedure upon data arrival for that UE and this procedure will involve other RAN nodes per the configuration in the network which was earlier given to UE. In the LTE/4G system this configuration would have included the UE's tracking area. If the former case where the UE comes active in another/new RAN node of a 5G system different from the last-serving RAN node, the UE context needs to be fetched by the new RAN node. UE context is well known in the radio arts and typically includes the UE's authentication and security keys, serving CP/UP gateways, capabilities, etc. as well as other subscriber information that originates from the UE's home subscriber server. Particularly in a beamformed radio system where different beams need to be swept to cover the different regions of a given cell, fetching this UE context for an idle/inactive-state UE re-connecting to the network can cause unacceptable setup delays and latency in establishing communications.

In the LTE/4G system the UE context is stored in the mobility management entity (MME) in the core network. The MME is the network entity that initiates the LTE paging procedure, and it is the MME that forwards the UE context to the radio access node/eNB where the UE becomes active.

Related to development for the Internet of Things (IoT), the 3GPP organization introduced RRC connection suspend—resume procedures to reduce RRC signaling for certain types of UE's referred to as machine-type communication (MTC) devices when they are sending small amount of uplink data. This feature is now being extended to support normal smart phone types of UEs.

The teachings herein are not limited to deployment in a 5G system but are consistent with the general objectives set out for it in document RP-160671 by NTT and DOCOMO entitled New SID Proposal: Study on New Radio Access Technology [3GPP TSG RAN Meeting #71; Göteborg, Sweden; 7-10 Mar. 2016].

BRIEF SUMMARY

This section is intended to include examples and is not intended to be limiting.

In an example of an embodiment, a method is disclosed that includes configuring by a first network node a timer for a user equipment which is started when an inactivity criteria is met, upon expiry of the timer, allowing cell reselection for the user equipment based on a frequency criteria between a first frequency and at least a second frequency; and forwarding the user equipment context by the first network node controlling the first frequency to at least a second network node controlling the at least second frequency.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to at least: configure by a first network node a timer for a user equipment which is started when an inactivity criteria is met, upon expiry of the timer, allow cell reselection for the user equipment based on a frequency criteria between a first frequency and at least a second frequency; and forward the user equipment context by the first network node controlling the first frequency to at least a second network node controlling the at least second frequency.

In another example of an embodiment, an apparatus comprises means for configuring by a first network node a timer for a user equipment which is started when an inactivity criteria is met, means for upon expiry of the timer, allowing cell reselection for the user equipment based on a frequency criteria between a first frequency and at least a second frequency; and means for forwarding the user equipment context by the first network node controlling the first frequency to at least a second network node controlling the at least second frequency.

In an example of an embodiment, a method is disclosed that includes receiving at a user equipment from a first network node on a first frequency layer a configuration comprising a timer and information about a second frequency layer, initiating the timer upon the user equipment entering an inactive state; prior to expiry of the initiated timer, monitoring paging occasions on the first frequency layer; and upon expiry of the timer, autonomously monitoring paging occasions on the second frequency layer.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: receive at a user equipment from a first network node on a first frequency layer a configuration comprising a timer and information about a second frequency layer, initiating the timer upon the user equipment entering an inactive state; prior to expiry of the initiated timer, monitor paging occasions on the first frequency layer; and upon expiry of the timer, autonomously monitor paging occasions on the second frequency layer.

In another example of an embodiment, an apparatus comprises means for receiving at a user equipment from a first network node on a first frequency layer a configuration comprising a timer and information about a second frequency layer, means for initiating the timer upon the UE entering an inactive state; prior to expiry of the initiated timer, means for monitoring paging occasions on the first frequency layer; and upon expiry of the timer, means for autonomously monitoring paging occasions on the second frequency layer

BRIEF DESCRIPTION OF THE DRAWINGS

FIG. 3 is a plan view illustration of an example radio environment in which these teachings can be deployed to advantage, in which the large shaded ovals represent the target macro layer cells and the unshaded white ovals represent high frequency beams of the smaller layer cells.

FIGS. 4A-B are process flow diagrams summarizing certain aspects of the invention from the perspective of a radio network and of a user equipment/mobile device, respectively.

DETAILED DESCRIPTION

To get the full benefit from the concept of the RAN controlling the UE's inactive state, which is to be implemented for the 5G radio system but not necessarily limited to that radio access technology, it would be beneficial to have the UE context available in a RAN node at which the UE next becomes active in order to minimize the access setup delays and data communication latency. These teachings are directed to that end result.

Different transceiver architectures are being considered for 5G radio access system: digital, analog and what is termed hybrid which utilizes a hybrid of digital baseband processing (such as MIMO Multiple Input Multiple Output and/or digital precoding). Although some aspects of these teachings may be discussed in the context of analog beamforming (whether fully analog or hybrid transceiver), it should be appreciated that the techniques detailed by example herein are applicable also for digital beamforming transceiver architectures.

Figure 1:
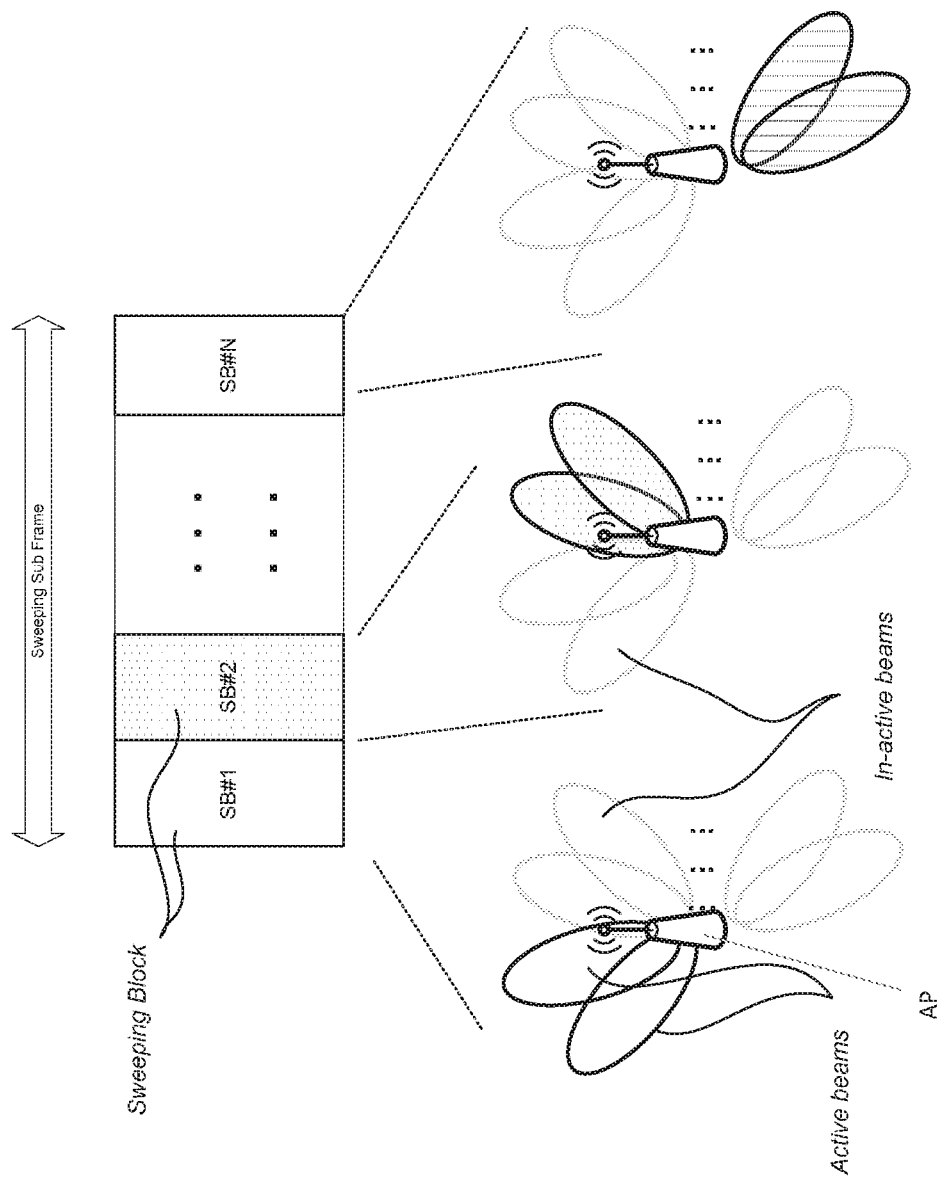
FIG. 1 is a plan view illustration of a sweeping subframe of a radio frame in which different antenna groups transmit control information in different sweeping blocks of the subframe.

The ongoing development of the 5G radio system specifications has introduced what is referred to as a sweeping subframe which is to provide coverage for common control channel signaling with beam forming. A sweeping subframe consists of sweeping blocks (SB) where a single block covers a specific area of the cell with a set of active antenna beams. FIG. 1 illustrates an example of such a sweeping subframe, which is divided into blocks (time division duplexed or chronologically separated blocks as illustrated) where each block is associated with a group of antenna beams from a given access node. A similar sweeping subframe can also be used for frequency division duplexing (FDD) particularly at higher end carrier frequency bands; at lower frequency bands beamforming of common channels may not be needed. As shown, SB #1 is associated with the group of beams of an access point (AP) that are marked as active and shown by hashed shading, and respecting SB #1 all other beams of the AP are considered inactive as marked and shown by shadowing. Similarly, SB #2 is associated with the group of beams of the AP that are shown by dotted shading and with respect to SB #2 all other beams of the AP are considered inactive as shown by shadowing. This continues for all the different beam groups of the AP having a corresponding SB in the sweeping subframe. While not specifically shown, a sweeping subframe may be arranged such that different groups of antenna beams of different transmit-receive points (TRPs) operating in coordination are associated with different SBs. As the reader might imply from FIG. 1, in a 5G deployment the total number of beams required to cover a required cell area will typically be much larger than the number of concurrent active beams the access point is able to form. Therefore the radio access network needs to sweep through the cell coverage area in the time domain by activating different set of beams on each SB.

Consider a more specific example of a sweeping subframe in the downlink (DL) direction that provides downlink common control channel coverage. In this example each SB carries essential cell access information such as DL synchronization signals, system information such as MIB, SIB or the like (including PRACH/RACH configurations), paging, and any control information that needs to be broadcasted in a cell. In another example for the uplink (UL) direction the sweeping subframe/subframes may accommodate resources for the random access channel or other uplink channels requiring periodic availability such as a scheduling request (SR) and a sounding reference symbol (SRS).

Also relevant to the development of 5G radio system technology is the idea of UE beam grouping. For this typically the UE will perform some measurements to establish linkage between the radio network's communication beams (which are DL transmit/TX beams) and the UE's own receive (RX) beam direction. It is known to base such beam measurements on beam specific reference signals (BRS), beam refinement reference symbols (BRRS), demodulation reference symbols (DMRSs) used for control channel decoding, DMRSs used for data decoding, and the like. Further, assuming reciprocity between uplink and downlink (e.g. in TDD system) the established linkage between network's TX beams and UE's RX beams applies also for reverse link direction.

In order for the UE to identify a beam the following mappings can be made as a non-limiting example. Assume there are 8 different BRS signals are transmitted per sweep block; this means the receiver at the UE is potentially able to measure 8 different signal indices (beams or beam indices) in SB #1. The same BRS signals may be reused in the next sweep block SB #2. It follows then that the sweep block identifier (ID) needs to be determined in order for the UE to determine the beam index for any specific beam. The sweep block index may be explicitly signaled if the sweep block (sweep symbol or multiple symbols) conveys further information such as MIB, SIB, DL control information (CNTL) and/or DL data. Alternatively the sweep block itself may include a specific sequence to identify the block. So a beam index that uniquely identifies one beam of a sweeping subframe may be calculated as:

Beam index=BRS index*Sweep block index.

The UE may perform BRS signal level measurements during downlink sweeping subframes on 5G-NB communication beams and report the measurement results to 5G-NB. In this regard the UE will be detecting and measuring the BRS signals. Alternatively or additionally the network may also send additional reference signals for UE to measure and provide feedback, such as the BRRSs mentioned above. Depending on the measured signals different feedback may be used with respect to these BRS and BRRS measurements; for example BRS measurements may be performed on the beam reference signals which can be directly associated by the UE to a specific beam index while the BRRS measurements may be performed on specific beam reference signals but the beams used to send the signals may not be known at the UE side. In both cases the 5G-NB is able to map the measurement results on each reference signal to the actual beam indices.

The UE may feedback the measurement results by using physical layer signaling such as the physical uplink control channel (PUCCH) or higher layer signaling such as L2 (medium access control MAC) or L3 (radio resource control RRC) by transmitting a beam state information (BSI) report, or more generally a beam report. The BSI report may include information such as Beam Index—Beam RSRP (or RSRQ) of all detected beams or of some limited number N of the highest quality beams. The BSI report format may be limited by the signaling method being used at the time; for example if reported by PUCCH there are only a fixed number of bits available for this report but if reporting via a MAC control element (CE) there is some flexibility (which is determined by the grant size).

Depending on the measurement type, whether the measurement was made on BRS or BRRS (or the like), the report format may also be different. For example, when measuring BRS signals the UE may explicitly detect the beam indices that it measures but in the case of BRRS measurements the UE may only use a logical index of the detected beam specific reference signals. The report of BRRS measurements may be referred to as beam refinement information (BRI) to distinguish over the BSI that uses BRS measurements. The beam index space of BSI and BRI may also differ in size.

In some scenarios such as in inter-cell mobility reporting the UE may feedback also the Cell ID in order to provide context to the beam level measurements it reports.

On higher frequencies, in addition to 5G-NB beamforming the UE may also use beamforming itself. Such a UE may need to steer or otherwise form its receive (RX) beam to multiple directions to determine the desired or highest quality communication beam/direction. The UE may measure several RX directions and determine which direction provides the highest quality based on the predefined metrics. Such metrics may be, for example, the RX direction which detected the highest RSRP of a 5G-NB beam, or which RX direction detected the highest number of beams above a specific quality threshold.

As mentioned in the background section, in the LTE/4G system the paging is initiated by the MME, when DL data notification is received from the serving gateway (S-GW) for a UE in ECM-IDLE or RRC-IDLE mode. The UE location is known to the level of a tracking area which involves multiple eNBs (and possibly also multiple frequency layers in the RAN) and cells. In principle, the network is expected to send the paging via each cell to the intended UE, but the controlling specifications do not restrict optimizing this overhead at the implementation level, so for example the network can make an educated guess of the UE's current location from the UE's previous location update as opposed to paging every cell and frequency in the tracking area. Upon receiving the paging message, the UE is expected to trigger a Service Request procedure and camp on ECM-CONNECTED/RRC_CONNECTED with a cause value indicating mobile-terminated-access in the RRCConnectionRequest message the UE sends to the network after receiving its page.

In the 5G new radio system there is a new RAN-controlled inactive state, which many consider will improve the signaling burden that have been exposed for the LTE transitions from IDLE to CONNECTED states. To improve this signaling burden the UE context is to be kept in the RAN and, in theory, upon data arrival the UE context can be rapidly updated and data communication can begin. In this new RAN-controlled inactive state the UE location could be tracked by the RAN (similar to how the MME does it in the LTE/4G system when the UE is in the IDLE mode) or by the last-serving RAN node (eNB). This would involve potentially multiple eNBs and cells in the 5G system and would require the 5G RAN to page the inactive-state UE once DL data becomes available in the last-serving node/eNB. But as mentioned in the background section, paging the inactive-state UE in a 5G system would be expensive in terms of radio resources and latency due to cell size and large numbers of beams for which the beam(s) appropriate for the UE is not known to the network. In the inactive state the network cannot be assumed to know the UE's location with sufficient precision to page it efficiently.

In a particular deployment for implementing these teachings in a 5G system, UE mobility is controlled from a high frequency small cell towards a large cell operating in a lower frequency after a certain period of inactivity which it tracked by a timer. The UE context in this example is moved to the correct network node handling this frequency layer; in another deployment the macro and small cells may be operating at different transmit powers on the same frequency in which case the UE context is moved to the macro cell. This approach has the following technical effect:

The downlink data indication load that would otherwise exist in the high frequency layer is reduced to a small area because after a longer inactivity time the UE is moved to the other lower frequency layer.

When coverage of the frequencies (or RAN routing areas) are overlapping the UE is moved with very high certainty to the target cell.

The macro network layer (the large cell in this case) can start paging from the macro frequency layer (lower frequency layer in this case) and with high probability the UE is found under the base transceiver station (BTS) that will have the UE context. This reduces network and connection setup delays when the data connection with the UE reactivates again.

UE measurement requirements are reduced as the UE moves to the larger cell frequency because either there are fewer beams to select from or no beam selection is needed (the latter if the large cell/lower frequency uses one cell-wide beam).

Figure 2:
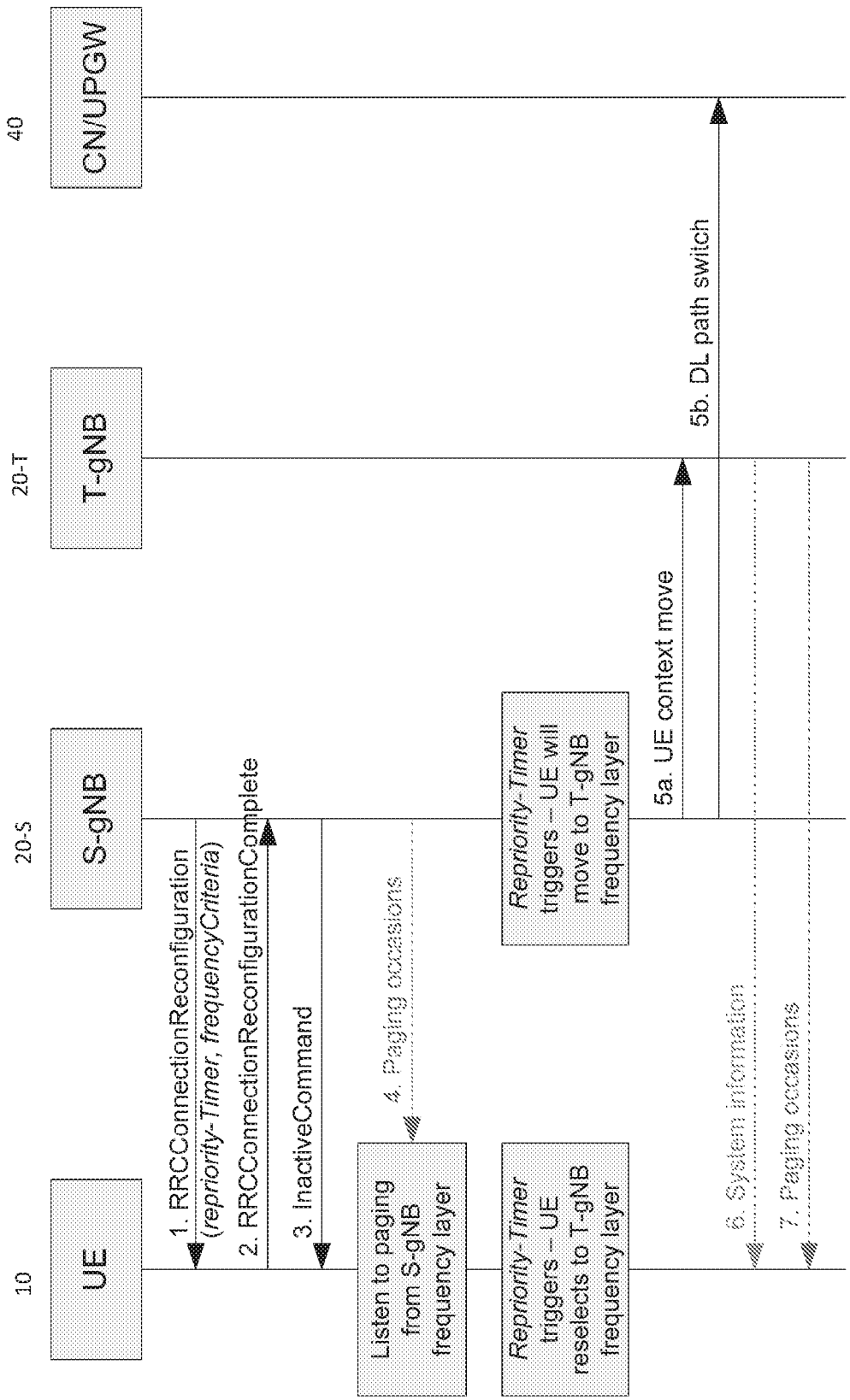
FIG. 2 is a signaling diagram among the UE and its serving radio access node S-gNB, further showing signaling between the S-gNB and the target radio access node T-gNB that pages the UE, according to an example embodiment of these teachings.

The signaling diagram of FIG. 2 illustrates a particular implementation for such a deployment using the network nodes deployed as represented by FIG. 3. In the 5G system the BTS is referred to as a gNB. The S-gNB is the UE's last serving gNB prior to the UE entering the inactive state and in an example embodiment it is assumed to be a small cell operating on a higher frequency, and hence operates with many beams. FIG. 3 illustrates such small cells as the center of each starburst of unshaded ovals, and the macro cell is labelled. Each oval represents a beam, so the unshaded ovals in a starburst pattern illustrate the many small beams that the S-gNB uses to provide radio coverage in its cell on relatively higher radio frequencies and the three large shaded ovals represent the much smaller number of beams that the T-gNB uses to provide radio coverage in its cell on relatively lower radio frequencies. With respect to FIG. 3, the UE is in a RRC connected state with the S-gNB 20-S and transitions to an inactivity state so the S-gNB is the UE's last-serving gNB.

From the network's perspective, until the time the UE enters the inactive state the radio access network knows the UE's location with relatively high precision and knows at least one preferred beam for this UE. Once the UE enters the inactive state the network knows the UE's location with much less precision, perhaps only to the level of a tracking area, and does not know a preferred beam for the UE.

Returning to the signaling diagram of FIG. 2, consider the S-gNB is operating on a first frequency layer and the T-gNB operating is operating on a different second frequency layer; these are the respective lower and higher frequencies as explained above. At message #1 the S-gNB 20-S reconfigures the UE 10 with the timer mentioned above which is referred to generally as an inactivity timer or more specifically in FIG. 2 as a repriority-Timer. This RRC connection reconfiguration message #1 also configures the UE 10 with frequency criteria as will be explained below. The UE acknowledges it is reconfigured as the gNB-S commanded by transmitting a RRC connection reconfiguration complete message #2. Now some inactivity criteria is met that causes the UE to enter the inactive state; in FIG. 2 this is by an explicit message #3 from the S-gNB but for purposes of these teachings the UE can enter the inactive state by any inactivity criteria, even implicit criteria within the UE itself such as by the UE terminating a voice call or closing an app through which the only current data flow is ongoing or via network configured timer expiration. At the time the UE enters the inactive state it initiates its inactivity/repriority-Timer. The S-gNB does the same for a parallel but otherwise identical timer it maintains in association with this UE.

Now the UE is in the inactive state and must listen for pages during its designated paging occasions #4. While the inactivity/repriority-Timer is running the UE listens during these paging occasions on the first frequency layer which is associated with the S-gNB 20-S. If it receives a page it re-establishes a connection normally. Upon expiry of the inactivity/repriority-Timer the UE will re-select to the second frequency layer that was configured for it by the network at message #1. This second frequency layer is one on which the T-gNB 20-T operates; in an example embodiment, the T-gNB is the larger/macro cell using one or a few beams to cover its larger geographic cell area and the second frequency layer in this example is a lower frequency than the S-gNB's first frequency layer.

The S-gNB 20-S knows itself when this UE's inactivity/repriority-Timer is running or expired, and expiry of this timer in the S-gNB triggers the S-gNB to move the UE context to the T-gNB 20-T at message 5*a*. Generally moving this UE context is part of a larger DL-path-switch procedure that involves the core network (CN-UPGW 40 in FIG. 2) so expiry of this UE's timer in the S-gNB 20-S triggers it to initiate that procedure to switch the UE's DL path from the S-gNB to the T-gNB. Message 5*b* is the S-gNB's DL path switch message to the core network.

Returning to the UE 10, once it's inactivity/repriority-Timer expires it tunes at message #6 to receive the broadcast system information from the second frequency layer to determine paging occasions. If the UE 10 has incoming DL data the core network will route it to the T-gNB 20-T which will page the UE via message #7 where the UE is listening to paging occasions from the second frequency layer.

FIG. 4A is a flow diagram from the perspective of the radio network that summarizes some of the above features described more particularly above. Such a radio network may include the S-gNB as the first network node, the T-gNB as the second network node, and the CN-UPGW. At block 402 the UE is configured by a first network node with a timer which is started when an inactivity criteria is met. In various examples the inactivity criteria comprises at least one of
  entering a RRC Inactive/IDLE State by the UE;
  sending/receiving the last data packet to/from the first network node; and
  the first network node sending an explicit command to move into a RRC Inactive/IDLE state;

At block 404, upon expiry of the said timer the network allows cell reselection for the UE based on a frequency criteria between a first frequency and at least a second frequency. In this regard 'allowing' means the network considers this as a normal (non-error) UE action, and the network has normal actions it takes to facilitate such UE action. In this case one of those normal actions is the UE context forwarding at block 406 at expiry of the timer if the frequency criteria of block 404 is satisfied. In an error scenario, if the UE context is not properly forwarded this should trigger the UE to perform a location update procedure to recover the network from the error. In various examples the frequency criteria comprises at least one of:
  the first network node providing an explicit frequency layer/band/carrier with higher absolute priority than that of the first network node;
  the first network node providing UE with a second set of radio access network (RAN) tracking area identities (IDs) with higher absolute priority than that of the first network node; and
  the first network node providing a set of cell identities with higher absolute priority than that of the first network node.

Finally at block 406 the UE context is forwarded by the first network node controlling the first frequency to at least a second network node controlling the at least second frequency.

In a particular embodiment the RAN tracking area is changed by the UE, without notifying the second network node upon trigger/expiry of the timer. In another embodiment the UE is configured with the timer based on a service the network provides to the UE, such that the UE is kept in the first frequency layer if the service is running and the UE is configured with the timer if the service is not running. So for example if the service is a multi-cast/broadcast service the timer is initiated when the multicast/broadcast service terminates.

In another example embodiment the first network node provides to the UE an identification of the first network node, and the second network node receives the identification of the first network node from the UE in one of an uplink data transmission or an uplink message that is part of a connection establishment/resume procedure. In FIG. 2 these would occur after the UE answers a page at its paging occasion message #7. Similarly the first network node can provide to the second network node an identification of the UE, and the second network node would receive from the UE that UE identification in one of that same uplink data transmission or same uplink message that is part of a connection establishment/resume procedure.

Message #1 of FIG. 2 can also configure the UE with a protocol configuration, which the first network node also provides to the second network node. The second network node receives from the UE uplink data that is transmitted with the protocol configuration; and the second network node processes that received uplink data with the protocol configuration.

In another example either (or both) of the first and second network nodes can provide, to a user plane gate way (UPGW) of the UE, a downlink data termination address that lies at second network node. In this case the second network node would receive from the UPGW downlink data directed to the UE. The second network node would then page the UE in response to receiving that downlink data directed to the UE.

In one embodiment when the timer is running and UE performs a location update such as a RAN tracking area update to a specific tracking area. The network may indicate to the UE about the context move done at messages 5*a*-5*b* of FIG. 2, in which case the UE would stop tracking the RAN paging area on the first frequency and track the tracking area according to the update which is on the second frequency.

In one alternative embodiment the UE may provide mobility information as part of the location update or part of the last data packet it sends before going into the inactive state. The UE may indicate it is in a high mobility state which allows the network to determine if the UE context should be moved to another frequency layer. This relieves the UE from providing overly frequent updates on its location via the first frequency layer. The network may indicate the context move explicitly to another frequency layer before the timer expires. And alternatively the network may determine timer values based on this mobility state information.

Further, the UE may send assistance information to the network about the UE's expected data traffic characteristics, which can help the network better track/anticipate the UE's location and choose the best second frequency to use. In yet a further additional or alternative embodiment the UE context is moved to the core network (UPGW) so that upon DL data arrival in the second network node it can simply fetch the UE context.

These teachings can further be embodied as an apparatus, such as a network access node/base station or components thereof, comprising at least one processor and at least one memory storing a computer program. In this embodiment the at least one processor is configured with the at least one memory and the computer program to cause the apparatus to perform the actions described above for FIG. 4A.

FIG. 4B is a flow diagram of certain aspects of the invention from the perspective of the mobile device/UE that summarizes some of the above features. The above specific embodiments and implementations which are reviewed above from the network perspective of FIG. 4A are of course also relevant from the UE perspective of FIG. 4B.

At block 452 the UE receiving from a first network node on a first frequency layer a configuration comprising a timer and information about a second frequency layer. At block 454 the UE initiates the timer upon the UE entering an inactive state. As described above from the network's perspective the inactivity state may be entered based on satisfying/meeting some inactivity criteria for which some examples are detailed above. Once the timer is initiated block 456 tells how the UE handles its paging occasions: prior to expiry of the initiated timer the UE monitors paging occasions on the first frequency layer, and upon expiry of the timer the UE autonomously monitors paging occasions on the second frequency layer. The UE context has certain security keys that are used to secure communications between the UE and the network. When the UE first establishes a RRC connection with the first network node (prior to going into the inactive state), some of those keys are negotiated in that one party provides a value which is used by the other party to compute another value for a security key. In this regard the computed value may be considered a negotiated security key, and the manner of establishing and negotiating the security keys are well known in the cellular radio arts. When the network moves the UE context, the UE need not re-negotiate those security keys with its new serving node since they will already be in the UE context that was transferred from the first network node. So the UE context transfer among network nodes can be manifest from the UE's perspective, in that the UE, prior to initiating the timer, establishes security with the first network node by negotiating at least one communication security key with the first network node; and ten after expiry of the timer, the UE establishes a RRC connection with a second network node on the second frequency layer utilizing the same (at least one) communications security key that was negotiated with the first network node.

These teachings from the UE perspective can further be embodied as an apparatus, such as a UE or components thereof, comprising at least one processor and at least one memory storing a computer program. In this embodiment the at least one processor is configured with the at least one memory and the computer program to cause the apparatus to perform the actions described above for FIG. 4B.

Each of FIGS. 4A-B themselves can be considered as an algorithm, and more generally represents steps of a method, and/or certain code segments of software stored on a computer readable memory or memory device that embody the respective FIG. 4A-B algorithm for implementing these teachings from the perspective of that respective device (base station or similar radio network access node, or UE). In this regard the invention may be embodied as a non-transitory program storage device readable by a machine such as for example one or more processors of a radio network access node or UE, where the storage device tangibly embodies a program of instructions executable by the machine for performing operations such as those shown at FIGS. 4A-B and detailed above.

According to one example embodiment, a method is providing including configuring by a first network node a timer for a UE which is started when an inactivity criteria is met, upon expiry of the timer, allowing cell reselection for the UE based on a frequency criteria between a first frequency and at least a second frequency; and forwarding the UE context by the first network node controlling the first frequency to at least a second network node controlling the at least second frequency.

The inactivity criteria may include at least one of: entering a RRC Inactive/IDLE State by the UE; sending/receiving the last data packet to/from the first network node; and the first network node sending an explicit command to move into a RRC Inactive/IDLE state. The frequency criteria may include at least one of: the first network node providing an explicit frequency layer/band/carrier with higher absolute priority than that of the first network node; the first network node providing UE with a second set of radio access network (RAN) tracking area identities (IDs) with higher absolute priority than that of the first network node; and the first network node providing a set of cell identities with higher absolute priority than that of the first network node. The method may include configuring the UE with the timer based on a service provided to the UE, such that the UE is kept in the first frequency layer if the service is running and the UE is configured with the timer if the service is not running. The method may include at least one of: when operating as the first network node, providing by the first network node to the UE an identification of the first network node, and when operating as the second network node, receiving from the UE at the second network node the identification of the first network node in one of an uplink data transmission or an uplink message that is part of a connection establishment/resume procedure. The method may include when operating as the first network node, providing by the first network node to the second network node an identification of the UE; and when operating as the second network node, receiving from the UE at the second network node the identification of the UE in one of an uplink data transmission or an uplink message that is part of a connection establishment/resume procedure. The method may include when operating as the first network node, providing, by the first network node to the second network node, a protocol configuration of the UE; when operating as the second network node, receiving from the UE at the second network node uplink data that is transmitted with the protocol configuration and further processing by the second network node the received uplink data with the protocol configuration. The method may include providing, by at least one of the first and second network nodes to a user plane gate way (UPGW) of the UE, a downlink data termination address that is at second network node; and when the operating as the second network node, receiving at the second network node from the UPGW downlink data directed to the UE. The method may include: when operating as the second network node, paging the UE, by the second network node, in response to receiving the downlink data directed to the UE.

According to another example embodiment an apparatus is provided including at least one processor; and at least one memory tangibly storing a computer program, wherein the at least one processor is configured with the at least one memory and the computer program to cause the apparatus to: configure by a first network node a timer for a UE which is started when an inactivity criteria is met, upon expiry of the timer, allow cell reselection for the UE based on a frequency criteria between a first frequency and at least a second frequency; and forward the UE context by the first network node controlling the first frequency to at least a second network node controlling the at least second frequency.

The inactivity criteria may include at least one of: entering a RRC Inactive/IDLE State by the UE; sending/receiving the last data packet to/from the first network node; and the first network node sending an explicit command to move into a RRC Inactive/IDLE state. The frequency criteria may include at least one of the first network node providing an explicit frequency layer/band/carrier with higher absolute priority than that of the first network node; the first network node providing UE with a second set of radio access network (RAN) tracking area identities (IDs) with higher absolute priority than that of the first network node; and the first network node providing a set of cell identities with higher absolute priority than that of the first network node. The at least one processor may be configured with the at least one memory and the computer program to cause the apparatus to: configure the UE with the timer based on a service provided to the UE, such that the UE is kept in the first frequency layer if the service is running and the UE is configured with the timer if the service is not running. The at least one processor may be configured with the at least one memory and the computer program to cause the apparatus to: when operating as the first network node, provide by the first network node to the UE an identification of the first network node, and when operating as the second network node, receive from the UE at the second network node the identification of the first network node in one of an uplink data transmission or an uplink message that is part of a connection establishment/resume procedure. The at least one processor may be configured with the at least one memory and the computer program to cause the apparatus to: when operating as the first network node, provide by the first network node to the second network node an identification of the UE; and when operating as the second network node, receive from the UE at the second network node the identification of the UE in one of an uplink data transmission or an uplink message that is part of a connection establishment/resume procedure. The at least one processor may be configured with the at least one memory and the computer program to cause the apparatus to: when operating as the first network node, provide, by the first network node to the second network node, a protocol configuration of the UE; when operating as the second network node, receive from the UE at the second network node uplink data that is transmitted with the protocol configuration and further processing by the second network node the received uplink data with the protocol configuration. The at least one processor may be configured with the at least one memory and the computer program to cause the apparatus to: provide, by at least one of the first and second network nodes to a user plane gate way (UPGW) of the UE, a downlink data termination address that is at second network node; and when the operating as the second network node, receive at the second network node from the UPGW downlink data directed to the UE. The at least one processor is configured with the at least one memory and the computer program to cause the apparatus to: when operating as the second network node, page the UE, by the second network node, in response to receiving the downlink data directed to the UE.

According to another example embodiment, an apparatus is provided including means for configuring by a first network node a timer for a UE which is started when an inactivity criteria is met, upon expiry of the timer, means for allowing cell reselection for the UE based on a frequency criteria between a first frequency and at least a second frequency; and means for forwarding the UE context by the first network node controlling the first frequency to at least a second network node controlling the at least second frequency.

According to another example embodiment, a method is provided including receiving at a user equipment from a first network node on a first frequency layer a configuration comprising a timer and information about a second frequency layer, initiating the timer upon the UE entering an inactive state; prior to expiry of the initiated timer, monitoring paging occasions on the first frequency layer; and upon expiry of the timer, autonomously monitoring paging occasions on the second frequency layer.

The method may include prior to initiating the timer, establishing security with the first network node by negotiating at least one communication security key with the first network node; and after expiry of the timer, establishing a RRC connection with a second network node on the second frequency layer utilizing the at least one communications security key that was negotiated with the first network node. The UE may enter the inactive state upon at least one of: sending or receiving a last data packet to or from the first network node; and receiving at the UE from the first network node an explicit command to move into a RRC Inactive/IDLE state. The UE may autonomously monitor paging occasions on the second frequency layer upon expiry of the timer only if the UE receives from the first network node at least one of the following: an explicit frequency layer/band/carrier with higher absolute priority than that of the first network node; a second set of radio access network (RAN) tracking area identities (IDs) with higher absolute priority than that of the first network node; and a set of cell identities with higher absolute priority than that of the first network node. The method may further include, upon expiry of the timer, changing the RAN tracking area by the UE without notifying the second network node.

According to another example embodiment, an apparatus is provided including at least one processor; and at least one memory tangibly storing a computer program, wherein the at least one processor is configured with the at least one memory and the computer program to cause the apparatus to: receive at a user equipment from a first network node on a first frequency layer a configuration comprising a timer and information about a second frequency layer, initiate the timer upon the UE entering an inactive state; prior to expiry of the initiated timer, monitor paging occasions on the first frequency layer; and upon expiry of the timer, autonomously monitor paging occasions on the second frequency layer.

The at least one processor may be configured with the at least one memory and the computer program to cause the apparatus to prior to initiating the timer, establish security with the first network node by negotiating at least one communication security key with the first network node; and after expiry of the timer, establish a RRC connection with a second network node on the second frequency layer utilizing the at least one communications security key that was negotiated with the first network node. The UE may enter the inactive state upon at least one of: sending or receiving a last data packet to or from the first network node; and receiving at the UE from the first network node an explicit command to move into a RRC Inactive/IDLE state. The UE may autonomously monitor paging occasions on the second frequency layer upon expiry of the timer only if the UE receives from the first network node at least one of the following: an explicit frequency layer/band/carrier with higher absolute priority than that of the first network node; a second set of radio access network (RAN) tracking area identities (IDs) with higher absolute priority than that of the first network node; and a set of cell identities with higher absolute priority than that of the first network node. The at least one processor may be configured with the at least one memory and the computer program to cause the apparatus to: upon expiry of the timer, change the RAN tracking area by the UE without notifying the second network node.

According to an example embodiment an apparatus is provided including: means for receiving at a user equipment from a first network node on a first frequency layer a configuration comprising a timer and information about a second frequency layer, means for initiating the timer upon the UE entering an inactive state; means for prior to expiry of the initiated timer, monitoring paging occasions on the first frequency layer; and means for upon expiry of the timer, autonomously monitoring paging occasions on the second frequency layer.

Figure 5:
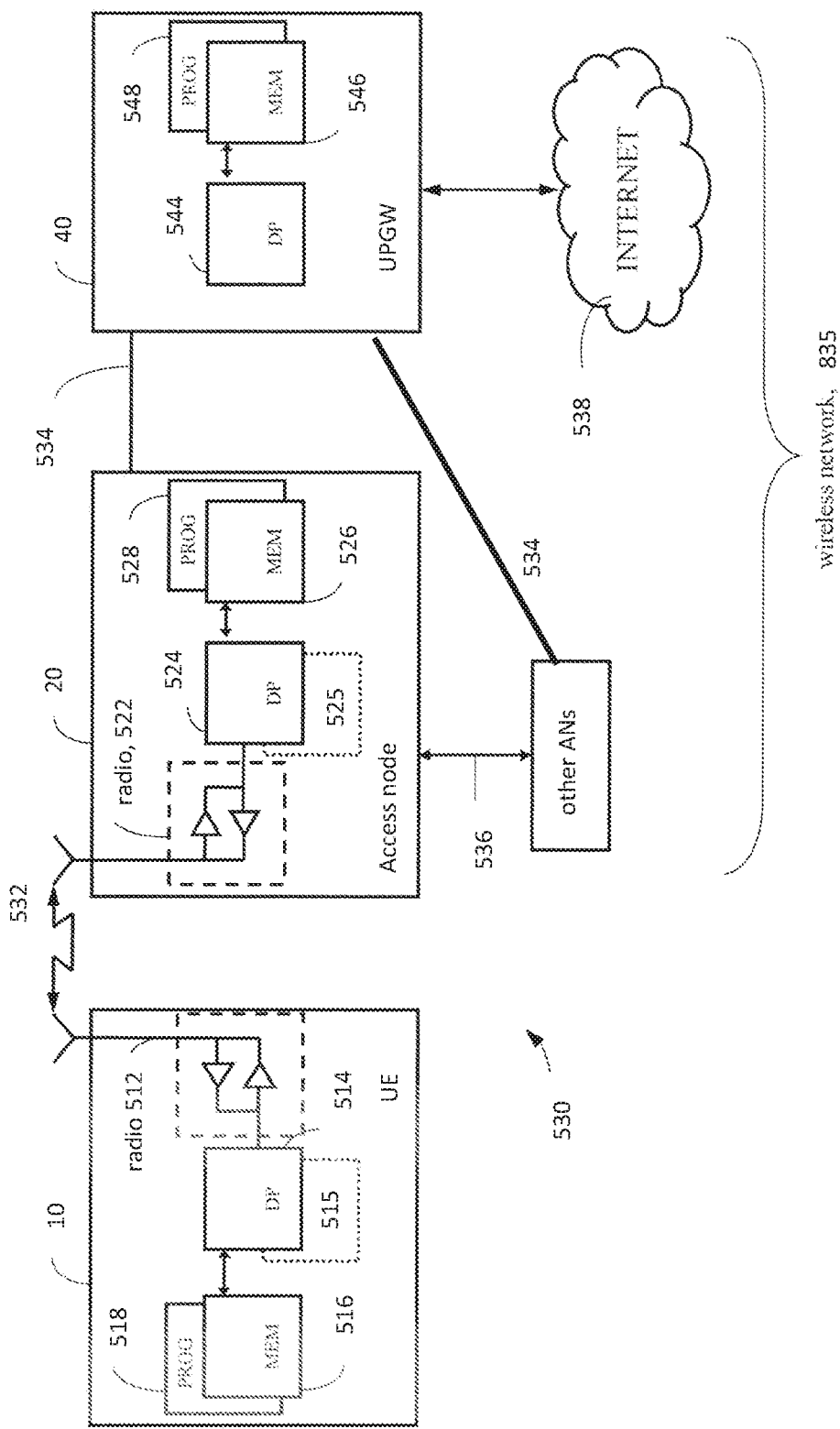
FIG. 5 is a diagram illustrating some components of a radio network access node/base station and a UE/mobile device, each of which are suitable for practicing various aspects of the invention.

FIG. 5 is a high level diagram illustrating some relevant components of various communication entities that may implement various portions of these teachings, including a base station identified generally as a radio network access node 20, a user-plane gateway (UPGW or uGW) 40, and a user equipment (UE) 10. In the wireless system 530 of FIG. 5 a communications network 535 is adapted for communication over a wireless link 532 with an apparatus, such as a mobile communication device which may be referred to as a UE 10, via a radio network access node 20. The network 535 may include a Serving-GW/UPGW 40 that provides connectivity with other and/or broader networks such as a publicly switched telephone network and/or a data communications network (e.g., the internet 538).

The UE 10 includes a controller, such as a computer or a data processor (DP) 514 (or multiple ones of them), a computer-readable memory medium embodied as a memory (MEM) 516 (or more generally a non-transitory program storage device) that stores a program of computer instructions (PROG) 518, and a suitable wireless interface, such as radio frequency (RF) transceiver or more generically a radio 512, for bidirectional wireless communications with the radio network access node 20 via one or more antennas. In general terms the UE 10 can be considered a machine that reads the MEM/non-transitory program storage device and that executes the computer program code or executable program of instructions stored thereon. While each entity of FIG. 5 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 20 also includes a controller, such as a computer or a data processor (DP) 524 (or multiple ones of them), a computer-readable memory medium embodied as a memory (MEM) 526 that stores a program of computer instructions (PROG) 528, and a suitable wireless interface, such as a RF transceiver or radio 522, for communication with the UE 10 via one or more antennas. The radio network access node 20 is coupled via a data/control path 534 to the UPGW 40. The path 534 may be implemented as an S1 interface. The radio network access node 20 may also be coupled to other radio network access nodes via data/control path 536, which may be implemented as an X5 interface.

The UPGW 540 includes a controller, such as a computer or a data processor (DP) 544 (or multiple ones of them), a computer-readable memory medium embodied as a memory (MEM) 546 that stores a program of computer instructions (PROG) 548.

Each of the controllers/processors 514/524/544 includes a clock which may be implemented as an oscillator. Various timers may be implemented in software to track elapsed time of such an oscillator as is well known in the art, and so separate clocks and timers for the various functions and processes are not separately shown at FIG. 6.

At least one of the PROGs 518, 528 is assumed to include program instructions that, when executed by the associated one or more DPs, enable the device to operate in accordance with exemplary embodiments of this invention. That is, various exemplary embodiments of this invention may be implemented at least in part by computer software executable by the DP 514 of the UE 10; and/or by the DP 524 of the radio network access node 20; and/or by hardware, or by a combination of software and hardware (and firmware).

For the purposes of describing various exemplary embodiments in accordance with this invention the UE 10 and the radio network access node 20 may also include dedicated processors 515 and 525 respectively.

The computer readable MEMs 516, 526 and 546 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 514, 524 and 544 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 512 and 522) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

Below are some acronyms used herein:
AP Access Point
BTS Base Transceiver Station (includes NB, eNB, gNB, AP)
CN Core Network
DL Downlink
DMRS Demodulation Reference Symbols
MME Mobility Management Entity
m-MIMO Massive Multiple-Input Multiple Output
MIB Master Information Block
mmWave Millimeter wave
PRACH Physical Random Access Channel
RACH Random Access Channel
RAN Radio Access Network
RRC Radio Resource Control
RSRP Reference Signal Received Power
RSRQ Reference Signal Received Quality
RX Receive or Receiver
SIB System Information Block
SR Scheduling Request
SRS Sounding Reference Signal/Symbol
TX Transmit or Transmitter
UE User Equipment
uGW user-plane gateway
UL Uplink
URLLC Ultra Reliable Low Latency Communication

What is claimed is:

1. An apparatus comprising:
at least one processor; and
at least one memory tangibly storing instructions that, when executed by the at least one processor, cause the apparatus at least to perform:
receiving at a user equipment, UE, from a first network node on a first frequency layer a configuration comprising a timer and information about a second frequency layer controlled by a second network node, wherein the timer is to be used to determine when to re-select by the UE to the second frequency layer, and wherein the UE uses UE context for communication with the first network node;
initiating the timer upon the UE entering an inactive state;
prior to expiry of the timer, monitoring paging occasions on the first frequency layer; and
upon expiry of the timer, keeping the UE context for use on the second frequency layer and re-selecting by the UE to the second frequency layer at least by autonomously monitoring paging occasions on the second frequency layer in the inactive state.

2. The apparatus as in claim 1, wherein the at least one memory further stores instructions that, when executed by the at least one processor, cause the apparatus at least to perform:
prior to initiating the timer, establishing security with the first network node by negotiating at least one communication security key as part of the UE context with the first network node; and
after expiry of the timer, establishing a radio resource control, RRC, connection with the second network node on the second frequency layer utilizing the at least one communications security key that was negotiated with the first network node and that is part of the kept UE context.

3. The apparatus as in claim 1, wherein:
the UE enters the inactive state upon at least one of:
sending a last data packet to or receiving the last data packet from the first network node; or
receiving at the UE from the first network node an explicit command to move into a RRC Inactive/IDLE state.

4. The apparatus as in claim 1, wherein the UE autonomously monitors paging occasions on the second frequency layer upon expiry of the timer only if the UE receives from the first network node at least one of the following:
an explicit frequency layer/band/carrier with a higher absolute priority than that of the first network node;
a second set of radio access network, RAN, tracking area identities, IDs, with a higher absolute priority than that of the first network node; or
a set of cell identities with a higher absolute priority than that of the first network node.

5. The apparatus as in claim 1, wherein the at least one memory further stores instructions that, when executed by the at least one processor, causes the apparatus at least to perform:
upon expiry of the timer, changing a radio access network, RAN, tracking area by the UE without notifying the second network node.

6. A method comprising:
receiving at a user equipment, UE, from a first network node on a first frequency layer a configuration comprising a timer and information about a second frequency layer controlled by a second network node, wherein the timer is to be used to determine when to re-select by the UE to the second frequency layer;
initiating the timer upon the UE entering an inactive state, wherein the UE uses UE context for communication with the first network node;
prior to expiry of the timer, monitoring paging occasions on the first frequency layer; and
upon expiry of the timer, keeping the UE context for use on the second frequency layer and re-selecting by the UE to the second frequency layer at least by autonomously monitoring paging occasions on the second frequency layer in the inactive state.

7. The method as in claim 6, further comprising:
prior to initiating the timer, establishing security with the first network node by negotiating at least one communication security key as part of the UE context with the first network node; and after expiry of the timer, establishing a radio resource control, RRC, connection with the second network node on the second frequency layer utilizing the at least one communications security key that was negotiated with the first network node and that is part of the kept UE context.

8. The method as in claim 6, wherein:
the UE enters the inactive state upon at least one of:
sending a last data packet to or receiving the last data packet from the first network node; or
receiving at the UE from the first network node an explicit command to move into a radio resource control, RRC, Inactive/IDLE state.

9. The method as in claim 6, wherein the UE autonomously monitors paging occasions on the second frequency layer upon expiry of the timer only if the UE receives from the first network node at least one of the following:
an explicit frequency layer/band/carrier with a higher absolute priority than that of the first network node;
a second set of radio access network, RAN, tracking area identities, IDs, with a higher absolute priority than that of the first network node; or
a set of cell identities with a higher absolute priority than that of the first network node.

10. A method, comprising:
configuring, by a first network node controlling a first frequency layer, a timer and information for a user equipment, UE, the information about a second frequency layer controlled by a second network node, wherein the timer is to be used to determine when to re-select by the UE to the second frequency layer, and wherein the first network node uses UE context for communication with the UE;
in response to the UE entering an inactive state, starting by the first network node the timer; and
upon expiry of the timer, performing the following by the first network node: allowing cell reselection for the UE based on a frequency criteria between the first frequency layer and the second frequency layer, and forwarding the UE context to at least a second network node controlling the second frequency layer, wherein the forwarding is triggered based on the expiry of the timer.

11. The method as in claim 10, wherein:
inactivity criteria is met that causes the UE to enter the inactive state, and the inactivity criteria comprises at least one of:
entering a radio resource control, RRC, Inactive/IDLE State by the UE;
sending a last data packet to or receiving the last data packet from the first network node; or
the first network node sending an explicit command to move into a RRC Inactive/IDLE state.

12. The method as in claim 10, wherein the frequency criteria comprises at least one of:
the first network node providing an explicit frequency layer/band/carrier with higher absolute priority than that of the first network node;
the first network node providing the UE with a second set of radio access network, RAN, tracking area identities, IDs, with a higher absolute priority than that of the first network node; or
the first network node providing a set of cell identities with a higher absolute priority than that of the first network node.

13. The method as in claim 10, wherein
when configuring the UE with the timer, configuring the UE with the timer based on a service provided to the UE, such that the UE is kept in the first frequency layer if the service is running and the UE is configured with the timer if the service is not running.

14. The method as in claim 10, wherein a network node operates as the first network node, and the method further comprises for the network node:
when operating as the first network node, providing by the first network node to the UE an identification of the first network node; and
when operating as the second network node, receiving from the UE at the second network node the identification of the first network node in one of an uplink data transmission or an uplink message that is part of a connection establishment/resume procedure.

15. The method as in claim 10, wherein a network node operates as the first network node, and the method further comprises for the network node:
when operating as the first network node, providing by the first network node to the second network node an identification of the UE; and
when operating as the second network node, receiving from the UE at the second network node the identification of the UE in one of an uplink data transmission or an uplink message that is part of a connection establishment/resume procedure.

16. The method as in claim 10, wherein a network node operates as the first network node, and the method further comprises for the network node:
when operating as the first network node, providing, by the first network node to the second network node, a protocol configuration of the UE; and
when operating as the second network node, receiving from the UE at the second network node uplink data that is transmitted with the protocol configuration and further processing by the second network node the received uplink data with the protocol configuration.

17. The method as in claim 10, wherein a network node operates as the first network node, and the method further comprises for the network node:
providing, by at least one of the first and second network nodes to a user plane gate way, UPGW, of the UE, a downlink data termination address that is at a second network node; and
when operating as the second network node, receiving at the second network node from the UPGW downlink data directed to the UE.

18. The method as in claim 17, further comprising for the network node:
when operating as the second network node, paging the UE, by the second network node, in response to receiving the downlink data directed to the UE.

19. The apparatus as in claim 10, wherein the first network node creates a size of a cell that is smaller than a size of a cell created by the second network node, and wherein the cell created by the second network node overlaps the cell created by the first network node.

* * * * *